Patented Apr. 10, 1928.

1,665,235

UNITED STATES PATENT OFFICE.

JOHN P. TRICKEY, OF EVANSTON, AND CARL S. MINER, OF CHICAGO, ILLINOIS, ASSIGNORS TO THE QUAKER OATS COMPANY, OF CHICAGO, ILLINOIS, A CORPORATION OF NEW JERSEY.

FURFURALCOHOL RESINS.

No Drawing.    Application filed May 31, 1924.  Serial No. 716,951.

This invention pertains to newly discovered furfuralcohol resinous substances and relates particularly to products that we have obtained from alcoholic furane derivatives, and to the methods of making such products.

Contrary to all previous chemical experiences with the alcohols, we have discovered that under properly controlled conditions certain reactions will take place in alcoholic furane derivatives such as furfuralcohol, and that materials in the nature of resins result from a transformation of the alcohol. We have discovered that such reactions may be made to take place by several different methods. For example, furfuralcohol by itself may be continuously heated for a long period of time and the reaction will then be manifested by the formation of small amounts of the resinous material. Furthermore, furfuralcohol may be allowed to stand without heating for a considerable time in the presence of a suitable catalyst and the reaction will also manifest itself by at least a small amount of resinification. We have discovered, however, that alcoholic furane derivatives, such as furfuralcohol, when heated in the presence of various catalyst are transformable into resinous material much more quickly than with the independent use of heat or a catalyst. A wide range of catalysts may be used and when the reaction is properly controlled, resins of various desirable physical properties are obtainable.

For example, we may add one-tenth of one percent (.1%) of hydrochloric acid to a quantity of furfuralcohol while heating the mixture to a temperature approximating 80° C. If this quantity of acid catalyst is added to the alcohol at room temperature, the reaction will take place only very slowly, and the alcohol will become completely transformed into a resinous material only after standing for a long period of time. However, if the addition of the catalyst is accompanied by heating of the mixture, the reaction will proceed much faster, in fact, the speed and extent to which the reaction proceeds may be largely controlled as desired by properly regulating the temperature. The reaction, being exothermic in character, will proceed of itself after the mixture is heated to approximately 80° C. If the reaction takes place in a large volume of the mixture, the heat resulting from the reaction may sometimes be excessive and thus may cause the reaction to proceed too rapidly and to become difficult to control. Accordingly, in treating large volumes of the mixture, as soon as the reaction starts, we proceed to control the temperature by applications of a cooling medium. We have found it desirable, with large volumes to maintain the temperature at about 110° C. or less. This temperature may be maintained, for example, by the use of refrigerating coils within or around the vessel containing the mixture.

Another convenient way of regulating the temperature is to heat the furfuralcohol with a quantity of water. For example, 500 grams of furfuralcohol are dissolved in 900 grams of water containing about 5 grams of hydrochloric acid and heated with constant agitation. When the temperature of this mixture rises to 70 to 80° C. an exothermic reaction starts and the resin begins to form. Because of the exothermic action the temperature will rapidly rise to about 98° C. but after a few minutes it will fall to about 93 to 95° C. where it may be allowed to remain for an hour or more until the reaction reaches the desired stage. When the reaction has progressed to a point where resin of the desired consistency is obtained, the water may be separated and the catalyst may be washed from the resin, preferably with a very weak alkaline solution. Extremely viscous, tacky resins may be obtained by this process.

With certain catalysts, the process may be efficiently and rapidly carried out by heating the reaction mixture under pressure to temperatures above the atmospheric boiling point of the furfuralcohol.

Aside from the control of the reaction by regulation of the temperature, we have found that the speed and extent of the reaction may be controlled by varying the percentage of active catalyst present. For example, by adding one per cent. (1%) of the hydrochloric acid, the reaction will immediately be manifested by producing a blackening of the mixture. If such a mixture is then heated, the reaction may become violent and difficult to control. If the strength of the acid is increased beyond one per cent. (1%), other conditions being as above described, the acid by itself without heating may cause a violent reaction. However, the reaction is usually most readily controlled with weak acids. The speed of the reaction may thus be also checked by neutralization, dilution with an inert liquid, or removal of the catalyst.

In the initial stages of the reaction, the mixture takes on a darker or blackened appearance. As the reaction proceeds a substance in the nature of resin is formed under properly controlled conditions of heat and catalysis. This substance is liquid at temperatures around 110° C., but upon cooling, it becomes a thick viscous mass which is soluble in acetone, furfural or other solvents, but is substantially insoluble in water. If the reaction is allowed to proceed as by further heating or by permitting the exothermic reaction to proceed, a solid resinous body which softens upon heating is obtainable. When the reaction proceeds to a conclusion, a substantially infusible, insoluble resin is obtained.

By properly controlling the speed and extent of the reaction as above described, we are able to secure products of various degrees of consistency, dependent upon the stage at which the reaction is arrested.

As above stated, we have also found that under certain conditions, furfuralcohol may even be converted into a resin without the aid of catalysts. For example, the furfuralcohol may be refluxed at a temperature approximating its atmospheric boiling point. If this heating process is carried out for several hours at a temperature approximating 170° C., substantially all of the alcohol will become resinified.

Since the reaction is readily controlled in accordance with our invention and may be arrested at any stage in the resinification of the alcohol, the resulting resins are adaptable to the various uses of the synthetic resins, natural gums, and resins.

Among other uses, the product may be utilized for the impregnation of various fibrous materials, may be incorporated in varnishes, and in either its viscous form or when softened by heat or with suitable solvents it may be used as a binder for fillers to provide a mixture for moulding purposes. Such mixtures may be reduced to a powder and used in hot or cold moulding operations.

In the manufacture of moulded goods and many other commercial applications resins normally are transformed into the insoluble and infusible state during the process. It is particularly advantageous that we are able to convert furfuralcohol resin into this state by the combined action of heat and catalysis, or by the use of either of these agents acting alone, the reaction being effected either with or without the use of pressure.

Throughout this application we have employed the terms "alcoholic derivative of furane" and "alcoholic furane derivatives". It is to be understood, however, that by these terms is meant a chemical compound containing no other ring nucleus but the furane ring, as distinguished from a furane compound which is a chemical compound containing another ring nucleus or other ring nuclei besides the furane ring.

It will be understood that various changes and substitutions of equivalents may be made without departing from the scope and principle of the invention set forth or intended to be set forth in the appended claims. We have also discovered that a wide range of materials and other acids than hydrochloric, for instance sulphuric acid or many of the mineral and organic acids, may be used as catalysts.

Having thus described our invention, what we claim as new and desire to secure by Letters Patent of the United States, is:

1. A resinous substance comprising the final substantially infusible and insoluble reaction product of furfuralcohol alone.

2. A substantially infusible and insoluble resin derived as a final product by catalytic action substantially entirely from an alcoholic derivative of furane.

3. The substantially insoluble infusible furfuralcoholic resin that results from the action of an acid catalyst upon a moldable viscous fusible resin comprising furfuralcohol alone.

4. The substantially insoluble infusible furfuralcohol resin that results from the heating of a moldable furfuralcohol resin alone.

5. The process of obtaining a moldable resinous body which comprises heating furfuralcohol alone in the presence of a catalyst to a temperature such that the heat developed by the reaction is sufficient to maintain the temperature of the reaction mixture without the application of external heat, and then arresting the reaction when a potentially reactive resin is formed by cooling the reaction mixture.

6. The process of making a moldable resinous substance which comprises heating furfuralcohol alone in the presence of hydrochloric acid as a catalyst to a temperature such that the heat developed by the reaction is sufficient to maintain the temperature of the reaction mixture without the application of external heat, and then arresting the reaction when a potentially reactive resin is formed by cooling the reaction mixture.

7. The process of obtaining a moldable resinous reaction product constituting furfuralcohol alone which comprises heating quantities of furfuralcohol and water together in the presence of a catalyst to a temperature such that the heat developed by the reaction is sufficient to maintain the temperature of the reaction mixture without the application of external heat.

In witness whereof, we have hereunto subscribed our names.

CARL S. MINER.
JOHN P. TRICKEY.